(12) United States Patent
Wang

(10) Patent No.: US 11,242,979 B2
(45) Date of Patent: Feb. 8, 2022

(54) AURORA BOREALIS SIMULATION DEVICE AND AURORA GENERATING METHOD

(71) Applicant: SHENZHEN AIKESI OPTOELECTRONICS TECHNOLOGY CO., LTD., Shenzhen (CN)

(72) Inventor: Lijian Wang, Shenzhen (CN)

(73) Assignee: SHENZHEN AIKESI OPTOELECTRONICS TECHNOLOGY CO., LTD., Shenzhen (CN)

( * ) Notice: Subject to any disclaimer, the term of this patent is extended or adjusted under 35 U.S.C. 154(b) by 54 days.

(21) Appl. No.: 16/887,077

(22) Filed: May 29, 2020

(65) Prior Publication Data

US 2021/0372596 A1    Dec. 2, 2021

(51) Int. Cl.
| | |
|---|---|
| *F21V 14/00* | (2018.01) |
| *F21V 14/06* | (2006.01) |
| *G03B 21/20* | (2006.01) |
| *F21V 3/06* | (2018.01) |
| *F21S 10/00* | (2006.01) |

(52) U.S. Cl.
CPC ............ *F21V 14/065* (2013.01); *F21V 3/061* (2018.02); *G03B 21/2033* (2013.01); *F21S 10/007* (2013.01)

(58) Field of Classification Search
CPC ........ F21V 14/065; F21V 14/06; F21V 3/061; F21V 9/12; G03B 21/20; G03B 21/2013; G03B 21/2033; F21Y 2115/10; F21Y 2115/30; F21S 10/002; F21S 10/007
See application file for complete search history.

(56) References Cited

U.S. PATENT DOCUMENTS

| | | | |
|---|---|---|---|
| 2003/0189831 A1* | 10/2003 | Yoneda | ...................... F21K 9/00 362/294 |
| 2016/0026073 A1* | 1/2016 | Zhang | ................ G03B 21/2013 353/101 |
| 2017/0082254 A1* | 3/2017 | Zhang | ................... F21S 10/007 |

* cited by examiner

*Primary Examiner* — Y M. Quach Lee
(74) *Attorney, Agent, or Firm* — Li & Cai Intellectual Property (USA) Office

(57) ABSTRACT

An aurora borealis simulation device and an aurora generating method are provided, which relates to the technical field of light simulators and includes: a simulation device main body and an aurora simulation component. A projection window is provided on the simulation device main body. The aurora simulation component comprises: a light-emitting unit; a fixing frame fixedly mounted on an inner wall of the simulation device main body; a radiator arranged on the fixing frame and assembled corresponding to the light-emitting unit; a first light-transmitting component of which one part is provided on the fixing frame and the other part extends toward a side of the projection window and is located between the projection window and the light-emitting unit, and a second light-transmitting component fixedly mounted on the simulation device main body and located within the projection window.

10 Claims, 4 Drawing Sheets

AURORA BOREALIS SIMULATION DEVICE AND AURORA GENERATING METHOD

FIELD OF THE DISCLOSURE

The present disclosure relates to the technical field of light simulation devices, in particular to an aurora borealis simulation device and an aurora generating method.

BACKGROUND OF THE DISCLOSURE

Aurora Borealis is a colorful and luminous phenomenon that appears over the high magnetic latitude area of the north pole of the planet. The aurora of the earth is generated by the excitation (or ionization) of molecules or atoms in the upper atmosphere from the flow of high-energy charged particles (solar wind) from the earth's magnetosphere or the sun. Aurora is a natural astronomical spectacle and has no fixed shape and with different colors, and the colors are mostly green, white, yellow, and blue. Occasionally, aurora also shows gorgeous red and purple, which is beautiful and mysterious.

The existing aurora borealis simulation lamp can only simulate the aurora borealis in color, but cannot simulate the shape of the aurora borealis, and cannot highly restore the aurora borealis in nature.

SUMMARY OF THE DISCLOSURE

The purpose of the present disclosure is to provide an aurora borealis simulation device and an aurora generating method in response to the defects and deficiencies of the prior art. A light is generated by the light-emitting unit, and the light passes through the second lens, the water wave patterned glass and the first lens in sequence. After that, it can generate excellent aurora borealis effect and then project to the simulation device main body through the projection window, so that the user can see the aurora borealis effect. The present disclosure has the advantages of simple structure, ingenious design, good aurora generation effect and good aurora simulation effect.

To achieve the above objectives, the technical solution adopted by the present disclosure is to provide an aurora borealis simulation device, comprising: a simulation device main body; and an aurora simulation component provided in the simulation device main body and configured to generate aurora borealis effect according to optical principle; wherein a projection window is provided on the simulation device main body and configured to project an aurora borealis simulation light, and the aurora simulation component comprises: a light-emitting unit; a fixing frame fixedly mounted on an inner wall of the simulation device main body and configured to fix the light-emitting unit; a radiator arranged on the fixing frame and assembled corresponding to the light-emitting unit, and configured to dissipate heat for the light-emitting unit; a first light-transmitting component of which one part is provided on the fixing frame and the other part extends toward a side of the projection window and is located between the projection window and the light-emitting unit, wherein the first light-transmitting component is configured to transmit a light emitted by the light-emitting unit to generate static or dynamic aurora borealis effect; and a second light-transmitting component fixedly mounted on the simulation device main body and located within the projection window, wherein the second light-transmitting component is configured to allow a light passing through the first light-transmitting component to penetrate to enhance the clarity of the static or dynamic aurora borealis effect.

In a preferred embodiment, the first light-transmitting component comprises: a power source, wherein a main body of the power source is fixedly assembled with the fixing frame, and a power output shaft of the power source is located between the light-emitting unit and the second light-transmitting component; and a water wave patterned glass mounted on the power output shaft of the power source and configured to generate aurora borealis effect after a light of the light-emitting unit is transmitted; wherein when the power source is not activated, the water wave patterned glass is stationary relative to the light-emitting unit, and a light generated by the light-emitting unit passes through the rotating water wave patterned glass to generate static aurora borealis effect, wherein when the power source is activated, the water wave patterned glass rotates synchronously with the power output shaft, and a light generated by the light-emitting unit passes through the rotating water wave patterned glass to generate dynamic aurora borealis effect.

In a preferred embodiment, the second light-transmitting component comprises: a lens fixing plate fixedly mounted on the simulation device main body and located within the projection window, and a mounting hole provided on the lens fixing plate; a first lens mounted in the mounting hole and configured to be transmitted by a light transmitting through the first light-transmitting component and adjust the clarity of the light transmitting through the first light-transmitting component; and a lens pressing plate mounted on a side of the lens fixing plate adjacent to the first light-transmitting component and configured to press and fix the first lens on the lens fixing plate.

In a preferred embodiment, the mounting hole is mounted corresponding to the light-emitting unit, a through hole is provided on the lens pressing plate, and the through hole is mounted corresponding to the mounting hole for a light to enter the first lens.

In a preferred embodiment, a fitting key is provided on the lens fixing plate, a fitting groove is provided on an inner wall of the projection window, and the lens fixing plate is fixedly mounted in the projection window by the matching of the fitting key and the fitting groove.

In a preferred embodiment, a second lens is provided on the light-emitting unit and configured to condense lights to enhance the intensity of the light emitted by the light-emitting unit.

In a preferred embodiment, the aurora borealis simulation device further comprises a laser assembly provided in the simulation device main body and configured to cooperate with the aurora simulation component to generate nebula effect.

In a preferred embodiment, mounting slots are provided on the lens fixing plate, circular holes are provided on the lens pressing plate, yield holes are provided on the fixing frame, and circular through holes are provided on the power output shaft of the power source, wherein the mounting slots, the circular holes, the yield holes and the circular through holes are correspondingly provided, and the laser assembly comprises: a laser fixedly mounted in the simulation device main body and having a light-emitting part corresponding to the yield holes; a first grating fixedly mounted on the power output shaft in the power source and configured to divide a light generated by the laser for the first time to generate multiple laser beams; and a second grating accommodated in the mounting slots and pressed and fixed by the lens pressing plate, and configured to divide the multiple laser beams divided by the first grating again to meet nebula effect requirements.

In a preferred embodiment, a square boss is provided on the lens pressing plate and configured to press the second grating against the lens fixing plate.

In a preferred embodiment, a control circuit board is provided in the simulation device main body and connected to the aurora simulation component and the laser assembly, wherein the simulation device main body further comprises: a Bluetooth board electrically connected to the control circuit board for Bluetooth connection with an external device; a speaker electrically connected to the control circuit board and configured to generate sounds according to information received by the Bluetooth board; a speaker cover fixedly mounted on the simulation device main body and corresponding to a sound output end of the speaker, wherein sound output holes are provided on the speaker cover; and a speaker gland mounted inside the simulation device main body and fixedly assembled with a lower cover for fixing the speaker on the lower cover.

In a preferred embodiment, the simulation device main body comprises an upper cover and the lower cover, and supporting feet are provided on the upper cover and the lower cover.

In a preferred embodiment, an aurora generating method is provided, wherein the method is based on the aurora borealis simulation device as mentioned above, and the method comprises the following steps: S1. preparing light-emitting units, wherein three light-emitting units are provided, and the three light-emitting units are respectively a red LED lamp bead, a green LED lamp bead and a blue LED lamp bead; S2. condensing lights respectively generated by the red LED lamp bead, the green LED lamp bead and the blue LED lamp bead through three second lenses; S3. projecting the lights condensed by the three second lenses onto a water wave patterned glass, and the lights passing through the water wave patterned glass form red, green and blue light images according to a pattern on the water wave patterned glass; and S4. an image light formed by the water wave patterned glass magnifying the red, green and blue light images through the first lens and projecting outward from a projection window, so that the red, green and blue light images formed by the water wave patterned glass are clearer and generate aurora borealis effect.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

Figure 1:
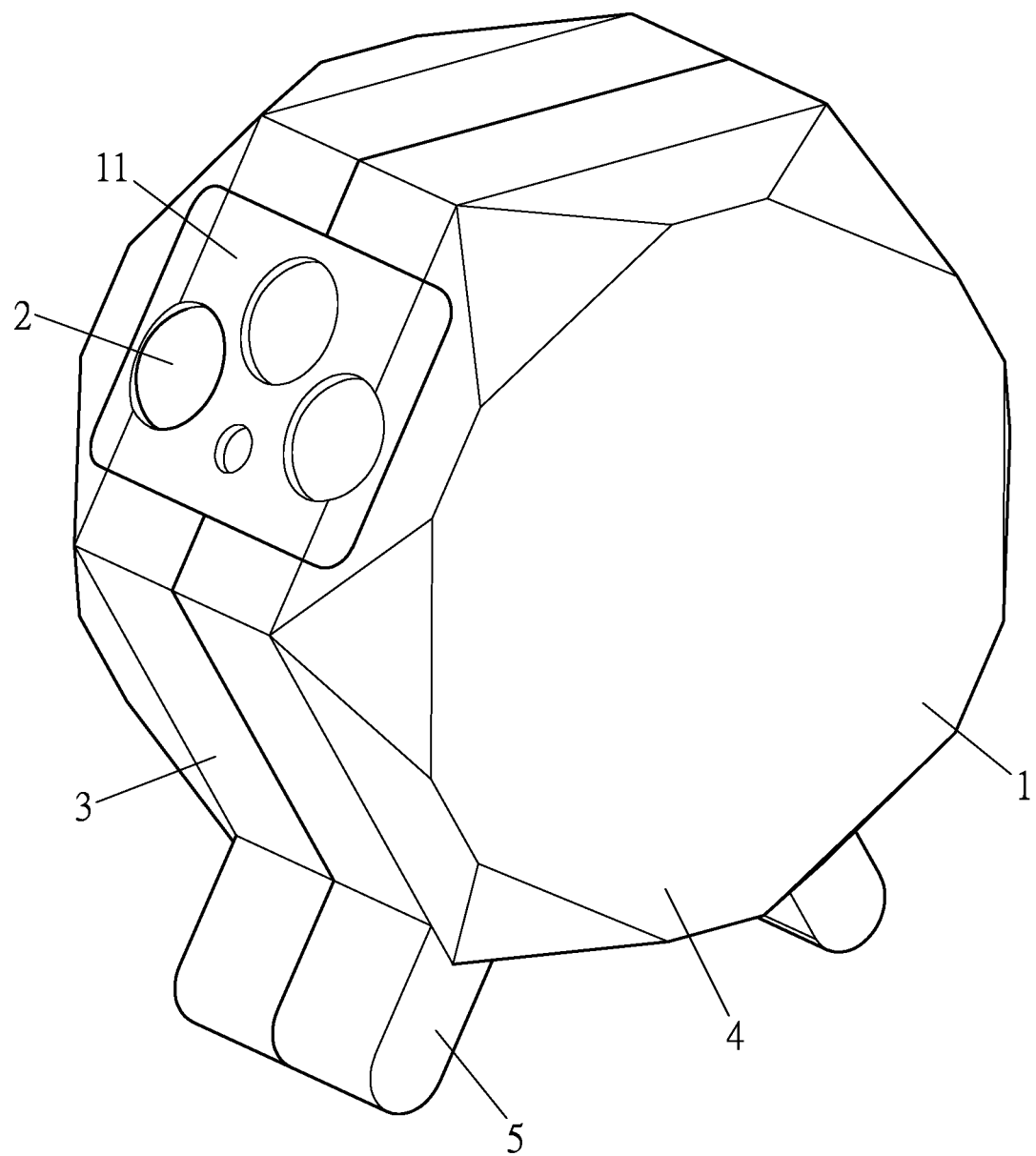
FIG. 1 is a schematic diagram of the overall structure of the present embodiment.

Reference numeral: 1. simulation device main body; 2. aurora simulation component; 3. upper cover; 4. lower cover; 5. supporting feet; 6. projection window; 7. light-emitting unit; 8. fixing frame; 9. radiator; 10. first light-transmitting component; 11. second light-transmitting component; 12. power source; 13. water wave patterned glass; 14. second lens; 15. lens fixing plate; 16. first lens; 17. lens pressing plate; 18. mounting hole; 19. fixing part; 20. circular boss; 21. fitting key; 22. card slot; 23. laser assembly; 24. laser; 25. first grating; 26. second grating; 27. square boss; 28. Bluetooth board; 29. speaker; 30. speaker cover; 31. speaker gland; 32. control circuit board.

DETAILED DESCRIPTION OF THE EXEMPLARY EMBODIMENTS

The present disclosure will be described in further detail below with reference to the drawings.

The specific embodiment is only an explanation of the present disclosure, and it is not a limitation of the present disclosure. Those skilled in the art can make modifications without creative contribution to the present embodiment after reading this specification, but as long as they have the right in the present disclosure within the scope of the requirements are protected by patent law.

Figure 2:
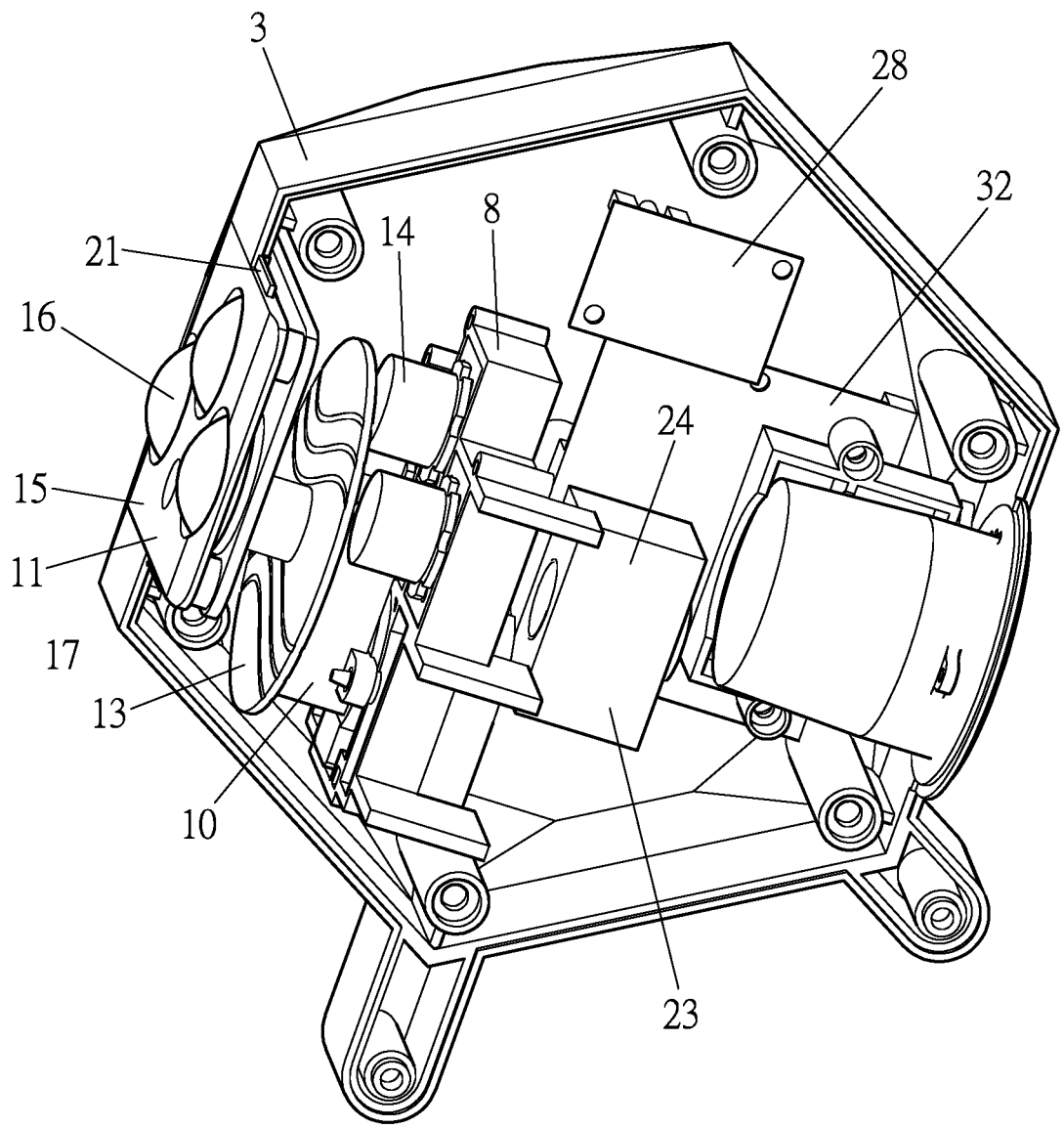
FIG. 2 is a schematic structural view of the present embodiment after removing a lower cover.
Figure 3:
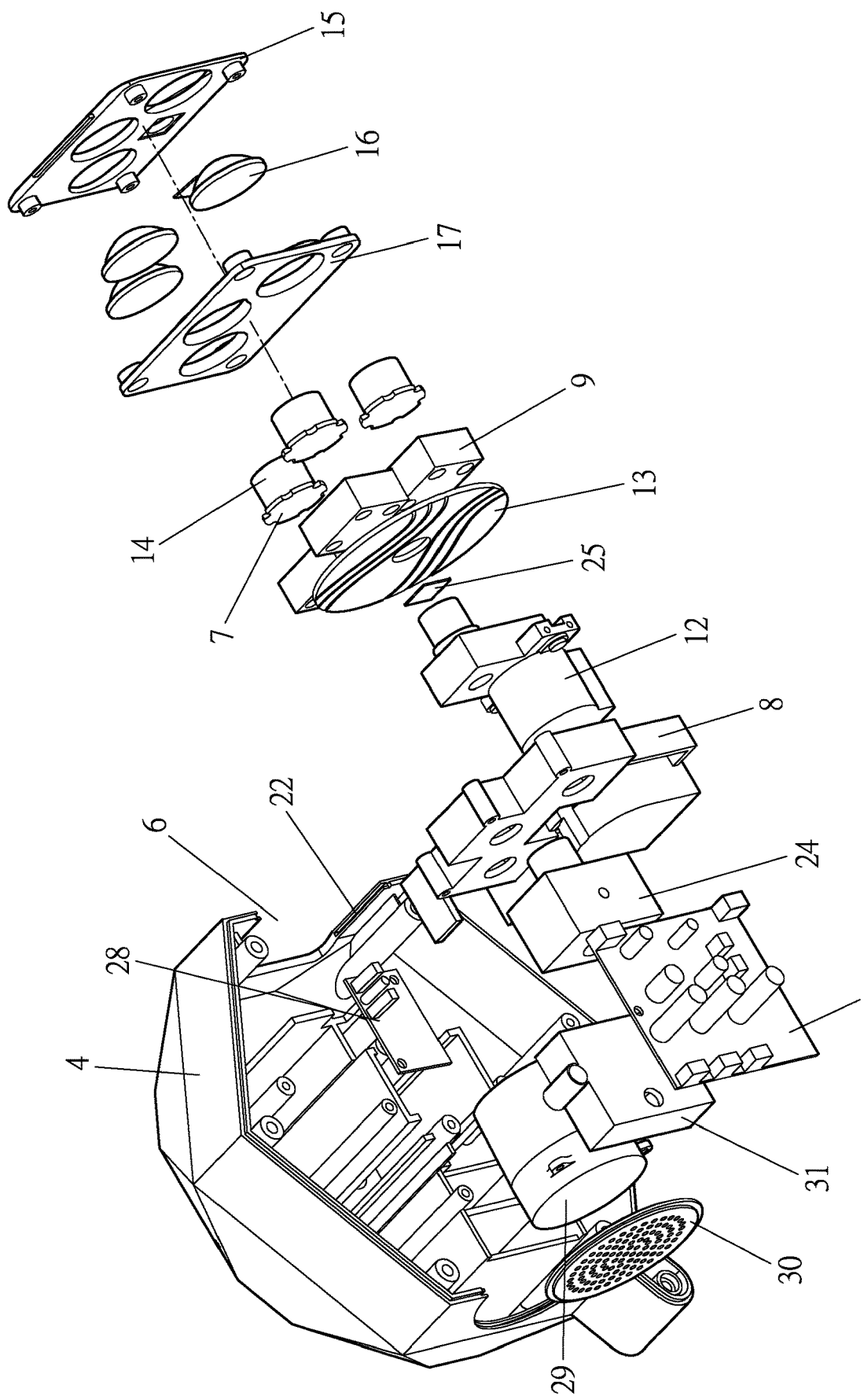
FIG. 3 is an exploded view of the present embodiment after removing an upper cover.
Figure 4:
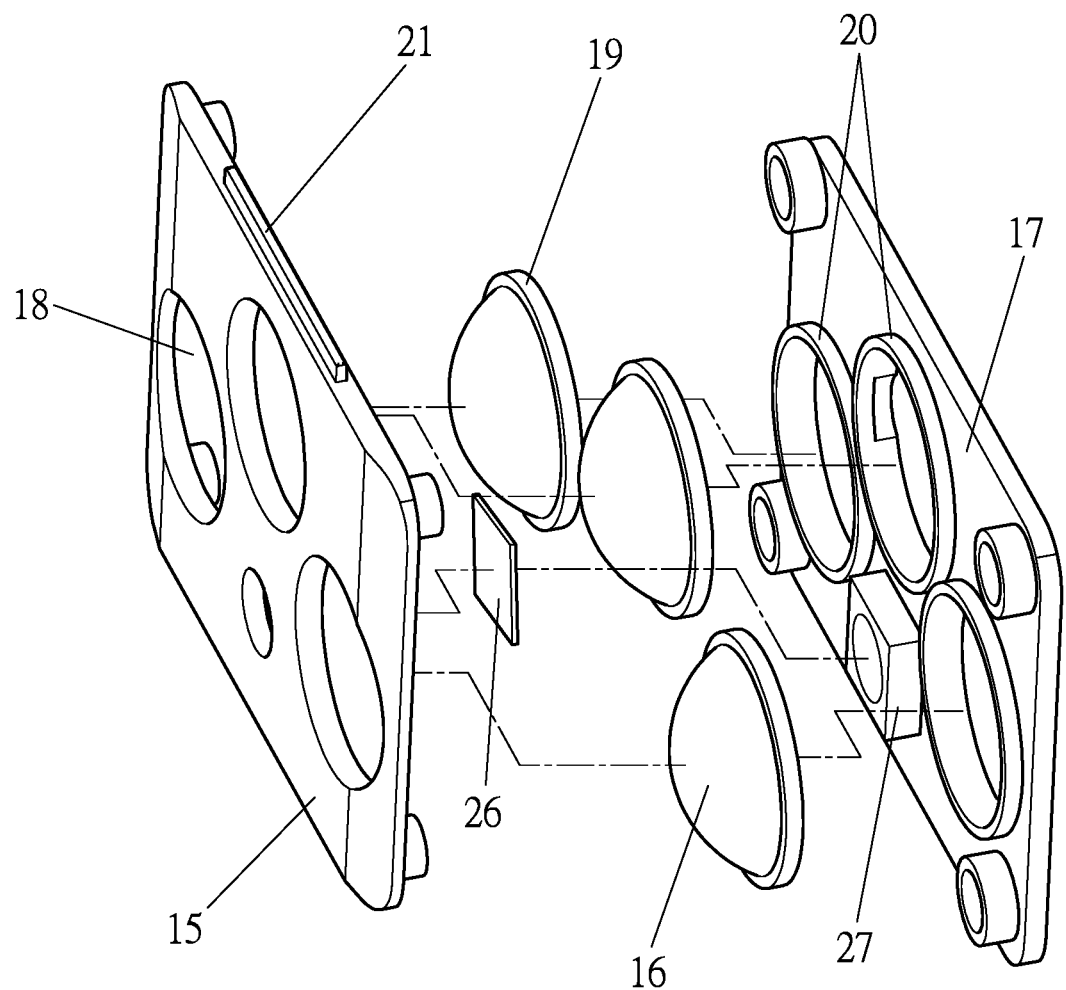
FIG. 4 is a schematic structural diagram of a second light-transmitting component and a second grating of the present embodiment.

The present embodiment relates to an aurora borealis simulation device, as shown in FIGS. 1-4, including: a simulation device main body 1 and an aurora simulation component 2.

The simulation device main body 1 is mainly used for the mounting of the aurora simulation component 2. The aurora simulation component 2 is mounted in the simulation device main body 1 and used to generate the aurora borealis effect according to the optical principle. In the present embodiment, the main body includes an upper cover 3 and a lower cover 4, and two supporting feet 5 are provided on the upper cover 3 and the lower cover 4. The upper cover 3 and the lower cover 4 have a hexagonal prism shape as a whole.

Further, as shown in FIGS. 1-4, the simulation device main body 1 is provided with a projection window 6 for the projection of the aurora borealis simulation light. The aurora simulation component 2 includes: a light-emitting unit 7, a fixing frame 8, a radiator 9, a first light-transmitting component 10 and a second light-transmitting component 11.

The light-emitting unit 7 is used to emit the light required to generate the aurora effect. The fixing frame 8 is fixedly mounted on an inner wall of the simulation device main body 1 by fastening screws. The fixing frame 8 is used for installing and fixing the light-emitting unit 7. The radiator 9 is arranged on the fixing frame 8 and assembled corresponding to the light-emitting unit 7. The radiator 9 plays a role of heat dissipation for the light-emitting unit 7, so as to effectively ensure the service life of the light-emitting unit 7. One part of the first light-transmitting component 10 is disposed on the fixing frame 8, and the other part of the first light-transmitting component 10 extends toward a side of the projection window 6 and is located between the projection window 6 and the light-emitting unit 7. The first light-transmitting component 10 is used for transmitting light emitted by the light-emitting unit 7 to generate static or dynamic aurora borealis effect. The second light-transmitting component 11 is fixedly mounted on the simulation device main body 1 and located within the projection window 6. The second light-transmitting component 11 is used to allow a light passing through the first light-transmitting component 10 to penetrate to enhance the clarity of the static or dynamic aurora borealis effect and enlarge the image generated by the first light-emitting component 10.

Preferably, as shown in FIGS. 1-4, three light-emitting units 7 are provided, which are a red LED lamp bead, a yellow LED lamp bead, and a blue LED lamp bead, respectively. After lights passing through the first light-transmitting component 10, the light-emitting unit 7 forms an image with three kinds of light of red, yellow and blue (aurora borealis effect).

Further, as shown in FIGS. 1-4, the first light-transmitting component 10 includes: a power source 12 and a water wave patterned glass 13. The main body of the power source 12 is fixedly assembled with the fixing frame 8, and the power output shaft of the power source 12 is located between the light-emitting unit 7 and the second light-transmitting component 11. The water wave patterned glass 13 is mounted on the power output shaft of the power source 12, and the water wave patterned glass 13 is used for transmitting the light generated by the light-emitting unit 7 to generate aurora borealis effect (with images of three kinds of red, yellow, and blue lights).

It should be noted that when the power source 12 is not activated, the water wave patterned glass 13 is stationary relative to the light-emitting unit 7, and the light generated by the light-emitting unit 7 passes through the water wave patterned glass 13 to generate static aurora borealis effect. When the power source 12 is activated, the water wave patterned glass 13 can rotate synchronously with the power output shaft, and the light generated by the light-emitting unit 7 passes through the rotating water wave patterned glass 13 to generate dynamic aurora borealis effect.

Preferably, as shown in FIGS. 1-4, a second lens 14 is provided on the light-emitting unit 7, and the second lens 14 is used to condense lights to enhance the intensity of light emitted by the light-emitting unit 7.

Further, as shown in FIGS. 1-4, the second light-transmitting component 11 includes a lens fixing plate 15, a first lens 16, and a lens pressing plate 17. The lens fixing plate 15 is assembled with the simulation device main body 1. The lens fixing plate 15 is located within the projection window 6 and provided with a mounting hole 18. The first lens 16 is mounted in the mounting hole 18. The first lens 16 is used to transmit a light passing through the first light-transmitting component 10. The first lens 16 is also used to magnify the image with three kinds of red, yellow, and blue light passing through the first light-transmitting component 10 and adjust the clarity of the image with three kinds of red, yellow and blue light. The lens pressing plate 17 is mounted on a side of the lens fixing plate 15 adjacent to the first light-transmitting component 10. The lens pressing plate 17 is used for pressing and fixing the first lens 16 on the lens fixing plate 15.

Preferably, the mounting hole 18 is provided corresponding to the light-emitting unit 7, the lens pressing plate 17 is provided with a through hole, and the through hole is provided corresponding to the mounting hole 18 for the light to enter the first lens 16.

Preferably, as shown in FIGS. 1-4, the first lens 16 is provided with a fixing part 19 on a side adjacent to the lens pressing plate 17. The fixing part 19 is used for pressing the lens pressing plate 17 to be fixed on the lens fixing plate 15. The lens fixing plate 15 is provided with a circular boss 20 corresponding to a circular part, and the circular boss 20 is used to press the fixing part 19 to fix the first lens 16. In the present embodiment, the lens pressing plate 17 is provided with three through holes, the lens fixing plate 15 is provided with three mounting holes 18, there are three fixing parts 19 in total, and three circular bosses 20 are provided corresponding to the three fixing parts 19.

Further, as shown in FIGS. 1-4, the lens fixing plate 15 is provided with a fitting key 21, an inner wall of the projection window 6 is provided with a fitting groove 22, and the lens fixing plate 15 is fixedly mounted in the projection window 6 through the matching of the fitting key 21 and the fitting groove 22.

Further, as shown in FIGS. 1-4, the aurora borealis simulation device further includes a laser assembly 23. The laser assembly 23 is disposed in the simulation device main body 1, and the laser assembly 23 is used to cooperate with the aurora simulation component 2 to generate nebula effect.

Specifically, as shown in FIGS. 1-4, the lens fixing plate 15 is provided with mounting slots. The lens pressing plate 17 is provided with circular holes. The fixing frame 8 is provided with yield holes. The power output shaft of the power source 12 is provided with circular through holes. The mounting slots, circular holes, yield holes and circular through holes are set correspondingly. The laser assembly 23 includes a laser 24, a first grating 25 and a second grating 26.

The laser 24 is fixedly mounted in the simulation device main body 1. The light-emitting part of the laser 24 corresponds to the yield holes, so that the light generated by the laser 24 can pass through the yield holes, the circular through holes, the first grating 25, the circular holes, the second grating 26 and the mounting slots at a time. The first grating 25 is pasted and fixed on the power output shaft of the power source 12. The first grating 25 is used to divide the light generated by the laser 24 for the first time to generate multiple laser beams. The second grating 26 is accommodated in the mounting slots and pressed and fixed by the lens pressing plate 17, and is used to divide the multiple laser beams divided by the first grating 25 again to meet nebula effect requirements.

Preferably, as shown in FIGS. 1-4, a square boss 27 is provided on the lens pressing plate 17 and used to press the second grating 26 against the lens fixing plate 15.

Further, as shown in FIGS. 1-4, a control circuit board 32 is provided in the simulation device main body 1 and connected to the aurora simulation component 2 and the laser assembly 23. The simulation device main body 1 further includes a Bluetooth board 28, a speaker 29, a speaker cover 30 and a speaker gland 31.

As shown in FIGS. 1-4, the Bluetooth board 28 is electrically connected to the control circuit board 32 and used for Bluetooth connection with an external device, so that a data connection is established between the external Bluetooth device and the aurora borealis simulation device. The speaker 29 is electrically connected to the control circuit board 32. The speaker 29 is used to generate sounds according to the information received by the Bluetooth board 28. The speaker cover 30 is fixedly mounted on the simulation device main body 1 and corresponds to the sound output end of the speaker 29. The speaker cover 30 is provided with sound output holes for the sound for the sound of the speaker 29. The speaker cover 31 is disposed inside the simulation device main body 1 and fixedly assembled with the lower cover 4. The speaker gland 31 is used to fix the speaker 29 on the lower cover 4.

It should be noted that the Bluetooth board 28 is provided in the simulation device main body 1, so that the aurora borealis simulation device can be wirelessly connected with an external Bluetooth device, and the speaker 29 is provided in the simulation device main body 1, so that the external Bluetooth device can play music or voice through the aurora borealis simulation device, so as to achieve the effect of combining the light effect with the music, thereby enhancing the user experience.

The working principle of the present embodiment is roughly as follows. When using the above-mentioned aurora borealis simulation device, three lights of red, yellow and blue are emitted through the light-emitting unit 7 first, and the light generated by the light-emitting unit 7 is condensed by the second lens 14 so as to enhance the light generated by the light-emitting unit 7. The enhanced light is projected on the water wave patterned glass 13. Since the water wave patterned glass 13 is provided with a pattern, the light penetrates the water wave patterned glass 13 to form an image with three kinds of red, yellow and blue light. Finally, the image with three kinds of red, yellow and blue light is enlarged and adjusted the clarity thereof by the first lens 16 and projected outward through the projection window 6 on the simulation device main body 1, thereby generating an excellent aurora borealis effect. The water wave patterned glass 13 is mounted on the power output shaft of the power source 12, and when the power source 12 is activated, the water wave patterned glass 13 rotates with the power output shaft, so that the pattern on the water wave patterned glass 13 moves relative to the first lens 16, and further generates dynamically-changeable aurora borealis effect; in addition, the aurora component is disposed on the aurora simulation component 2, so that the light generated by the laser 24 passes through the yield holes and the circular through holes, and illuminates on the first grating 25, thereby obtaining multiple laser beams. Then, the obtained multiple laser beams are irradiated on the second grating 26 through the lens pressing plate 17 again, so that the laser beams divided by the second grating 26 form starlight throughout the environment of aurora borealis effect, and the formation of starlight makes the aurora borealis simulation device generate nebula effect. The aurora borealis simulation device set up in this way can not only generate the aurora borealis effect, but also can generate the dynamically-changeable aurora borealis effect, and in addition, it can also generate the dynamically-changeable and static effects of nebula. The present disclosure has the advantages of diverse light effects, simple structure, ingenious design, good light effect generation effect, and good light effect simulation effect.

Based on the above technical solution, the present embodiment also provides an aurora generating method, wherein the method is based on the aurora borealis simulation device as mentioned above, and the method comprises the following steps: S1. preparing light-emitting units, wherein three light-emitting units are provided, and the three light-emitting units are respectively a red LED lamp bead, a green LED lamp bead and a blue LED lamp bead; S2. condensing lights respectively generated by the red LED lamp bead, the green LED lamp bead and the blue LED lamp bead through three second lenses; S3. projecting the lights condensed by the three second lenses onto a water wave patterned glass, and the lights passing through the water wave patterned glass form red, green and blue light images according to a pattern on the water wave patterned glass; and S4. an image light formed by the water wave patterned glass magnifying the red, green and blue light images through the first lens and projecting outward from a projection window, so that the red, green and blue light images formed by the water wave patterned glass are clearer and generate aurora borealis effect.

The above-mentioned descriptions represent merely an exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. An aurora borealis simulation device, comprising:
   a simulation device main body (1); and
   an aurora simulation component (2) provided in the simulation device main body (1) and configured to generate aurora borealis effect according to optical principle;
   wherein a projection window (6) is provided on the simulation device main body (1) and configured to project an aurora borealis simulation light, and the aurora simulation component (2) comprises:
   a light-emitting unit (7);
   a fixing frame (8) fixedly mounted on an inner wall of the simulation device main body (1) and configured to fix the light-emitting unit (7);
   a radiator (9) arranged on the fixing frame (8) and assembled corresponding to the light-emitting unit (7), and configured to dissipate heat for the light-emitting unit (7);
   a first light-transmitting component (10) of which one part is provided on the fixing frame (8) and the other part extends toward a side of the projection window (6) and is located between the projection window (6) and the light-emitting unit (7), wherein the first light-transmitting component (10) is configured to transmit a light emitted by the light-emitting unit (7) to generate static or dynamic aurora borealis effect; and
   a second light-transmitting component (11) fixedly mounted on the simulation device main body (1) and located within the projection window (6), wherein the second light-transmitting component (11) is configured to allow a light passing through the first light-transmitting component (10) to penetrate to enhance the clarity of the static or dynamic aurora borealis effect,
   wherein the first light-transmitting component (10) comprises:
   a power source (12), wherein a main body of the power source (12) is fixedly assembled with the fixing frame (8), and a power output shaft of the power source (12) is located between the light-emitting unit (7) and the second light-transmitting component (11); and
   a water wave patterned glass (13) mounted on the power output shaft of the power source (12) and configured to generate aurora borealis effect after a light of the light-emitting unit (7) is transmitted,
   wherein when the power source (12) is not activated, the water wave patterned glass (13) is stationary relative to the light-emitting unit (7), and a light generated by the light-emitting unit (7) passes through the water wave patterned glass (13) to generate static aurora borealis effect, wherein when the power source (12) is activated, the water wave patterned glass (13) rotates synchronously with the power output shaft, and a light generated by the light-emitting unit (7) passes through the rotating water wave patterned glass (13) to generate dynamic aurora borealis effect, and
   wherein the second light-transmitting component (11) comprises:
   a lens fixing plate (15) fixedly mounted on the simulation device main body (1) and located within the projection window (6), and a mounting hole (18) provided on the lens fixing plate (15);
   a first lens (16) mounted in the mounting hole (18) and configured to be transmitted by a light transmitting through the first light-transmitting component (10)

and adjust the clarity of the light transmitting through the first light-transmitting component (10); and a lens pressing plate (17) mounted on a side of the lens fixing plate (15) adjacent to the first light-transmitting component (10) and configured to press and fix the first lens (16) on the lens fixing plate (15).

2. The aurora borealis simulation device according to claim 1, wherein the mounting hole (18) is mounted corresponding to the light-emitting unit (7), a through hole is provided on the lens pressing plate (17), and the through hole is mounted corresponding to the mounting hole (18) for a light to enter the first lens (16).

3. The aurora borealis simulation device according to claim 2, wherein a fitting key (21) is provided on the lens fixing plate (15), a fitting groove (22) is provided on an inner wall of the projection window (6), and the lens fixing plate (15) is fixedly mounted within the projection window (6) by the matching of the fitting key (21) and the fitting groove (22).

4. The aurora borealis simulation device according to claim 3, wherein a second lens (14) is provided on the light-emitting unit (7) and configured to condense lights to enhance the intensity of the light emitted by the light-emitting unit (7).

5. The aurora borealis simulation device according to claim 2, wherein the aurora borealis simulation device further comprises a laser assembly (23) provided in the simulation device main body (1) and configured to cooperate with the aurora simulation component (2) to generate nebula effect.

6. The aurora borealis simulation device according to claim 5, wherein mounting slots are provided on the lens fixing plate (15), circular holes are provided on the lens pressing plate (17), yield holes are provided on the fixing frame (8), and circular through holes are provided on the power output shaft of the power source (12), wherein the mounting slots, the circular holes, the yield holes and the circular through holes are correspondingly provided, and the laser assembly (23) comprises:
    a laser (24) fixedly mounted within the simulation device main body (1) and having a light-emitting part corresponding to the yield holes;
    a first grating (25) fixedly mounted on the power output shaft in the power source (12) and configured to divide a light generated by the laser (24) for the first time to generate multiple laser beams; and
    a second grating (26) accommodated in the mounting slots and pressed and fixed by the lens pressing plate (17), and configured to divide the multiple laser beams divided by the first grating (25) again to meet nebula effect requirements.

7. The aurora borealis simulation device according to claim 6, wherein a square boss (27) is provided on the lens pressing plate (17) and configured to press the second grating (26) against the lens fixing plate (15).

8. The aurora borealis simulation device according to claim 5, wherein a control circuit board (32) is provided in the simulation device main body (1) and connected to the aurora simulation component (2) and the laser assembly (23), wherein the simulation device main body (1) further comprises:
    a Bluetooth board (28) electrically connected to the control circuit board (32) for Bluetooth connection with an external device;
    a speaker (29) electrically connected to the control circuit board (32) and configured to generate sounds according to information received by the Bluetooth board (28);
    a speaker cover (30) fixedly mounted on the simulation device main body (1) and corresponding to a sound output end of the speaker (29), wherein sound output holes are provided on the speaker cover (30); and
    a speaker gland (31) mounted inside the simulation device main body (1) and fixedly assembled with a lower cover (4) for fixing the speaker (29) on the lower cover (4).

9. The aurora borealis simulation device according to claim 8, wherein the simulation device main body (1) comprises an upper cover (3) and the lower cover (4), and supporting feet (5) are provided on the upper cover (3) and the lower cover (4).

10. An aurora generating method, wherein the method is based on the aurora borealis simulation device according to claim 9, and the method comprises the following steps:
    S1. preparing light-emitting units (7), wherein three light-emitting units (7) are provided, and the three light-emitting units (7) are respectively a red LED lamp bead, a green LED lamp bead and a blue LED lamp bead;
    S2. condensing lights respectively generated by the red LED lamp bead, the green LED lamp bead and the blue LED lamp bead through three second lenses (14);
    S3. projecting the lights condensed by the three second lenses (14) onto a water wave patterned glass (13), and the lights passing through the water wave patterned glass (13) form red, green and blue light images according to a pattern on the water wave patterned glass (13); and
    S4. an image light formed by the water wave patterned glass (13) magnifying the red, green and blue light images through the first lens (16) and projecting outward from a projection window (6), so that the red, green and blue light images formed by the water wave patterned glass (13) are clearer and generate aurora borealis effect.

* * * * *